Oct. 11, 1960 — B. J. OLENDER — 2,955,863
TAIL GATE LATCH FOR PICK-UP TRUCK BOX
Filed May 2, 1958 — 2 Sheets-Sheet 1

INVENTOR
BRUNO J. OLENDER
BY G. L. DeMatt
ATTORNEY

Oct. 11, 1960    B. J. OLENDER    2,955,863
TAIL GATE LATCH FOR PICK-UP TRUCK BOX
Filed May 2, 1958    2 Sheets-Sheet 2

INVENTOR
BRUNO J. OLENDER
BY G. L. DeMott
ATTORNEY

United States Patent Office 2,955,863
Patented Oct. 11, 1960

2,955,863
TAIL GATE LATCH FOR PICK-UP TRUCK BOX

Bruno J. Olender, Royal Oak, Mich., assignor to General Motors Corporation, Detroit, Mich., a corporation of Delaware Filed May 2, 1958, Ser. No. 732,715

7 Claims. (Cl. 292—264)

This invention relates to tail gate fastening devices for trucks and the like and more particularly to a latch adapted to secure a tail gate in either open or closed position.

An important object of the invention is to provide a strong, reliable, overcenter latching device which will contribute anti-rattling characteristics while securely retaining the tail gate in closed position.

A further object of the latch is to securely retain the tail gate in open position regardless of vibratory vehicular operating conditions.

A still further object is to reduce the effects of manufacturing variations in latch fabrication thereby providing continuous take up for latch wear.

Other objects and advantages will appear from the following description when read in conjunction with the accompanying drawings in which, Figure 1 is a perspective view of a pickup truck box and tail gate equipped with a fastening device embodying my invention;

Figure 4 is a perspective view of the tail gate attached bracket which cooperates with the latch handle in both open and closed gate positions.

Figure 4a is an enlarged partial elevational view of Figure 4, partly in section and with parts removed showing the relative positions of the tail gate bracket and the latch handle when the parts are first assembled prior to lowering of the gate.

Figure 4b is an enlarged partial elevational view of Figure 4, partly in section and with parts removed showing the relative positions of the tail gate bracket and the latch handle when the gate is in its lowered position.

Figure 1:
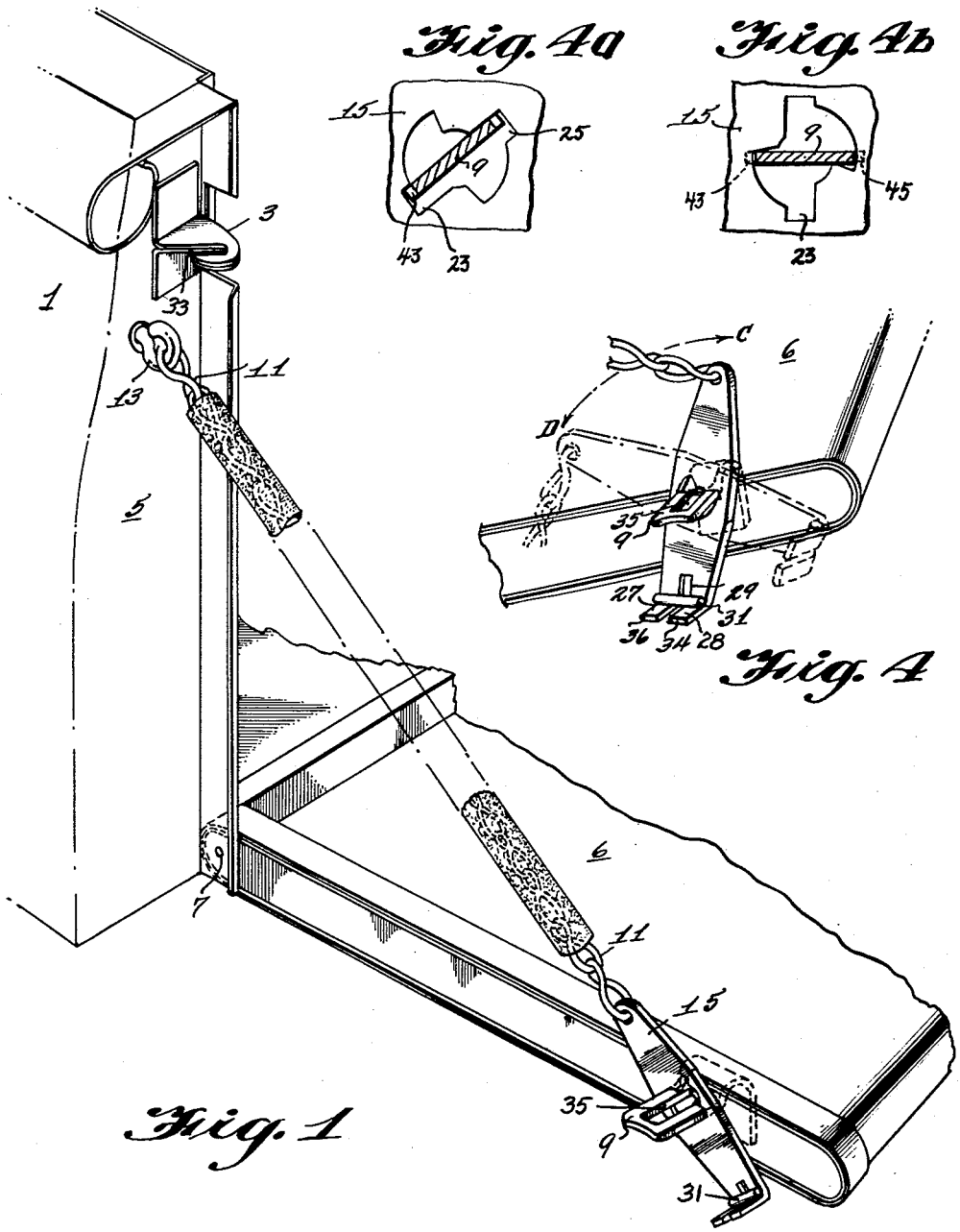

As best illustrated in Figure 1, I employ a truck body side panel 1 to support a hook member 3 attached to an end wall 5 of the side panel. Tail gate 6 pivoted to the truck body about an axis 7 has secured adjacent its free end and to a side wall thereof an ear member or bracket 9. Suspended on a chain 11 from an eye member 13 also secured to end wall 5 is a latch handle member 15, described later in detail, adapted to engage bracket 9 for retaining tail gate 6 in open position, and to engage hook member 3 for securing the tail gate in closed position.

Figure 2:
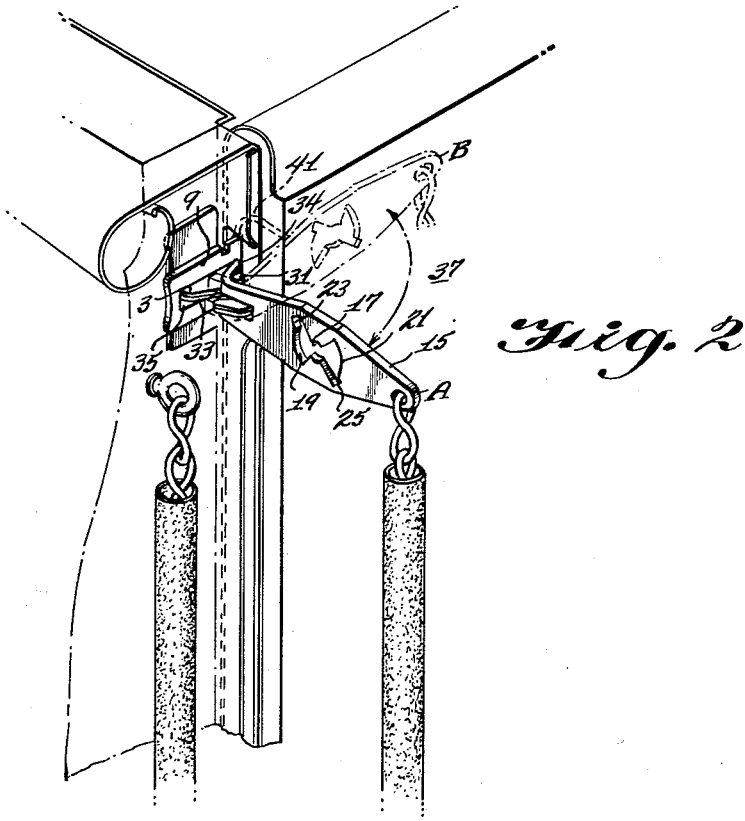
Figure 2 is a perspective view of a portion of the tail gate in closed position, showing the overcenter latching operation of my device.

With reference now to Figure 2 the overcenter latching operation of my invention will be fully explained. Latch handle 15 has an aperture 17 including interconnected sector-shaped portions 19, 21 and notches 23, 25. One end of the handle is formed into L-shaped terminal portions 27, 28 bounding a slot 29 therebetween and extending into the body of the handle (Figure 4). A pin 31 traverses the slot 29 at the junction of the terminal portion 27 with the body of the handle 15. Hooked member 3 secured to the end wall 5 of the side panel is formed with a slot 33 opening outboard of the truck and adapted to receive pin 31 during the latching operation.

The latching operation is initiated by swinging the tail gate upwardly into a vertical position so that aperture 35 of bracket 9 overlies hook member 3. In this relationship the pin 31 of the L-shaped end section is inserted in slot 33 of the hook member with the terminal portions 27, 28 facing inwardly. To obtain a latched condition, handle 15 is pivoted inwardly about pin 31 from position A toward the outer rear surface 37 of tail gate 6 to position B, Fig. 2. During this movement tip portions 34, 36 of terminals portions 27, 28 slide along the surface of bracket 9 until an overcenter relationship is achieved, said bracket 9 being arcuately formed in cross section, as at 38, to bias the said terminal portions rearwardly, and the handle 15 into securely latched position with tail gate 6. This biasing effect of bracket 9 also serves to hold pin 31 in slot 33 during the latching operation. Although the preferred embodiment for providing overcenter latching is shown as an L-shaped end section and transverse pin, it is to be understood that any other arrangement to which the end of handle 15 could be adapted to provide overcenter latching is encompassed within the area sought to be protected by this disclosure.

Additional utility is incorporated in my latch handle 15 and bracket 9 by way of novel configurations which facilitate both the support and the secure retention of the tail gate when in an open relationship with the truck body.

Figure 3:
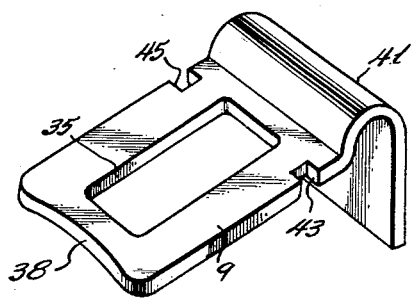
Figure 3 is a perspective view of a tail gate bracket useful in fastening devices embodying my invention.

As best shown in Figures 3 and 4, bracket 9 is secured in any manner to tail gate 6 limited only in that it must be so placed as to receive hook member 3 within aperture 35 when the tail gate is closed. The bracket is formed in a manner to provide deflectable characteristics as, for example, by forming that portion of the bracket secured to the tail gate in an arched manner, as at 41. Notches 43, 45, are formed along the sides of said bracket to slidably engage the periphery of aperture 17 in handle 15 as the latter is rotated from position C to D into tail gate retaining position (Fig. 4). As more clearly shown in Figure 4a, when the latch handle 15 is in position C of Figure 4, the bracket 9 is positioned within the slot of the handle terminated by the notches 23 and 25. In this position the handle is freely slidable on the bracket. With the handle in position D, as shown in Figure 4b, the notches 43, 45 of the bracket engage the surface of the handle adjacent the sector portions of the aperture 17 in the handle and the handle is locked on the bracket within the notches 43, 45. This arrangement prevents the handle from accidentally disengaging the bracket during the vibration attending vehicle operation. Aperture 17, of course, may be formed in any manner which will provide the retaining characteristics exhibited by the configuration here disclosed. In the present embodiment the aperture 17 has a length or first dimension that is greater than the width of the bracket 9 and has a width or second dimension that is less than the width of the bracket.

While I have shown a particular embodiment of my invention, it will, of course, be understood that I do not wish to be limited thereto, since many modifications may be made; and I, therefore, contemplate by the appended claims to cover all such modifications as fall within the true spirit and scope of my invention.

Having thus described my invention, what I claim is:

1. A fastening device for use with a tail gate of a vehicular body comprising a hook member attached to the end wall of the side panel above the axis along which said tail gate is swingable, a notched ear attached to the end wall of the tail gate having an aperture for receiving said hook member in the closed position of the tail gate, a handle having a centrally located aperture including two interconnected notched sector-shaped portions for receiving said ear in the horizontal position of the tail gate, means for overcenter latching and anti-rattle engagement of said handle with said hook member and tail gate including a slotted L-shaped end section mounted on said handle with a pin across the slot at the corner of the L-shaped section, and a support chain one terminus of which is attached to said handle and the other terminus of which is attached to the end wall of the side panel above the axis along which the tail gate is swingable.

2. A fastening device for use with a tail gate of a vehicular body comprising a hook member attached to the end wall of the side panel above the axis along which said tail gate is swingable, an ear attached to the end wall of the tail gate having an aperture for receiving said hook member in the closed position of the tail gate, a handle having a centrally located aperture for receiving said ear in the open position of the tail gate and a slotted L-shaped end section mounted on said handle adapted to cooperate with said hook member and said ear for anti-rattle overcenter retaining engagement of the tail gate, and a support chain one terminus of which is attached to said handle, the other terminus of which is attached to the end wall of the side panel above the axis along which the tail gate is swingable.

3. A fastening device for use with a tail gate of vehicular body comprising a hook member attached to the side panel above the axis along which said tail gate is swingable, an ear attached to the tail gate having an aperture for receiving said hook member in the upright position of the tail gate, and a handle supported from said body and having an aperture for receiving said ear in the open position of the tail gate and a slotted L-shaped end section carrying a pin across the inside corner of the L-shaped portion adapted to cooperate with said hook member and said ear for anti-rattle overcenter retaining engagement of the tail gate.

4. A fastening device for use with a tail gate of a vehicular body comprising a catch member on said body, an ear on said tail gate having an aperture for receiving said catch member in the closed position of the tail gate, a handle having an aperture for receiving said ear in the open position of the tail gate and means at one end thereof adapted to cooperate with said hook member and said ear for overcenter anti-rattle retaining engagement of the tail gate, and a support member extending from said body to said handle.

5. A fastening device for use with a tail gate of a vehicular body comprising a catch member on said body, a common handle means supported from said body for providing overcenter latching engagement with the tail gate in closed position and retaining engagement with the tail gate in open position, and a deflectable ear on said tail gate having an aperture for receiving said catch member and an arcuate cross-section for resisting disengagement of said handle means and catch member during latching operation.

6. A latching device having a handle with a centrally located aperture including two interconnected notched sector-shaped portions, and a slotted L-shaped end section with a pin across the slot at the inside corner of said L-shaped section.

7. A latching device for use with a first member swingable between open and closed positions relative to a second member comprising, a handle having an aperture in the general shape of two interconnected notched sector-shaped portions, means on said first member for receiving said apertured handle when said first member is in its open position, said handle further having a slotted substantially L-shaped end section and a transverse member across said slotted end section, and hook means secured to said second member, both the means on said first member and the L-shaped end section of said handle engaging said hook means when said first member is in closed position to provide anti-rattle engagement of said first and second members.

References Cited in the file of this patent

UNITED STATES PATENTS

| | | |
|---|---|---|
| 1,753,637 | Arntzen | Apr. 8, 1930 |
| 1,896,254 | Smith | Feb. 7, 1933 |
| 2,204,697 | Renno et al. | June 18, 1940 |
| 2,805,093 | Van Den Thoorn | Sept. 3, 1957 |
| 2,820,981 | Klee | Jan. 28, 1958 |